United States Patent Office 3,314,973
Patented Apr. 18, 1967

3,314,973
5 - (N - METHYL - PYRROLIDYL) - DIBENZO[a,d]
CYCLOHEPTA[1,4]DIENE OR ACID ADDITION
SALTS THEREOF
Ernst Jucker, Ettingen, and Anton Ebnöther, Reinach, Basel-land, Switzerland, assignors to Sandoz Ltd., also known as Sandoz A.G., Basel, Switzerland
No Drawing. Filed Nov. 26, 1965, Ser. No. 510,030
Claims priority, application Switzerland, July 14, 1961, 8,265/61
3 Claims. (Cl. 260—326.3)

This application is a continuation-in-part of application Ser. No. 209,254, filed July 11, 1962, now abandoned.

The present invention relates to new dibenzocycloheptadiene derivatives, their pharmaceutically acceptable acid addition salts and antidepressant compositions containing one or more of the same as active ingredients.

The present invention provides the following compounds:

(1) 5-{[1'-methyl-pyrrolidinyl-(3')]-methyl}-dibenzo-[a,d]cyclohepta[1,4]diene.
(2) 5-[1'-methyl-pyrrolidinyl-(3)]-dibenzo[a,d]cyclohepta[1,4]diene.
(3) 5-{2'-[1"-methyl-pyrrolidinyl-(2")]-ethyl}-dibenzo-[a,d]cyclohepta[1,4]diene.

their pharmaceutically acceptable acid addition salts and pharmaceutical compositions containing, in addition to an inert carrier, any one of the above mentioned compounds and/or a pharmaceutically acceptable acid addition salt thereof.

These compounds fall under the formula,

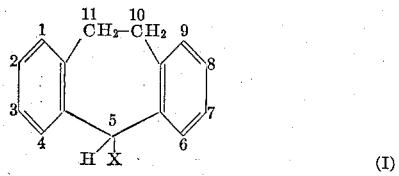

(I)

in which X is

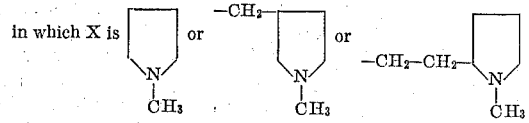

The production of compounds I and their acid addition salts is carried out by reducing a compound of the formula

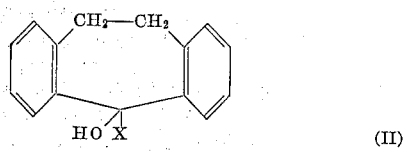

(II)

in which X has the above significance, in a manner known to reduce a 5-substituted-5-hydroxy-dibenzocycloheptadiene derivative to the corresponding non-hydroxylated compound, and when an acid addition salt is required, salification is effected in a manner known per se. Suitable acids for the salification are, for example, hydrochloric, hydrobromic, sulphuric, citric, oxalic, tartaric, succinic, maleic, malic, acetic, benzoic, hexahydrobenzoic, methanesulphonic, fumaric, gallic and hydriodic acid.

The term "known" as used herein designates a method described in the literature on the subject or in actual use.

The process may, for example, be effected as follows: A compound II, e.g. 5-hydroxy-5-{2'-[1"-methyl-pyrrolidinyl - (2")]ethyl} - dibenzo[a,d]cyclohepta[1,4]- diene, is heated in the presence of hydriodic acid and red phosphorus; suitably the heating may be effected for five to forty hours. Water is then added and the resulting precipitate is filtered off and treated with a dilute alkali metal hydroxide and an organic solvent, e.g. methylene chloride. After removing the phosphorus, the desired compound I is isolated from the organic phase in a manner known per se and preferably purified by salification.

Compound II in which the nitrogen atom of the basic radical is separated from the carbon atom in the 5-position of the dibenzo-cycloheptadiene by two carbon atoms, namely 5-hydroxy - 5 - [1'-methyl-pyrrolidinyl-(3')]-dibenzo[a,d]cyclohepta[1,4]diene can be prepared as follows:

Dibenzo[a,d]cyclohepta[1,4]diene-5-one is added to a suspension of an alkali metal amide, e.g. sodium or potassium amide, in N-methyl-pyrrolidone-(2) at a temperature of 0–15°. The mixture is then kept at room temperature for a further 1 to 2 hours. The reaction product is then poured into water, whereupon the compound of the formula

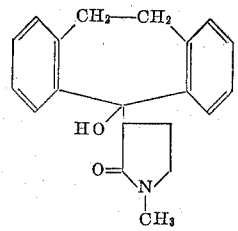

(III)

separates out, said compound being then reduced to yield the desired compound II.

The process may also be effected in that a solution of N-methyl-pyrrolidone-(2) in tetrahydrofuran, is added to a suspension of an alkali metal amide, e.g. sodium or potassium amide, in liquid ammonia and that dibenzo-[a,d]cyclohepta[1,4]diene-5-one, dissolved in the same solvent, is then added. The mixture is kept at the boiling point of the ammonia for a further 1 to 2 hours to complete the reaction and it is then poured into a solution of ammonium chloride in liquid ammonia. Compound III is then isolated and purified in accordance with known methods and then subsequently reduced to yield the desired compound II.

The reduction of compound III is preferably effected with lithium aluminium hydride in an inert organic solvent, e.g. tetrahydrofuran. Subsequently, the reaction complex is decomposed with a saturated sodium sulphate solution, the inorganic compounds are filtered off and the desired compound II is isolated from the filtrate in accordance with known methods and purified by crystallization.

Compounds II in which the nitrogen atom of the basic radical is separated from the carbon atom in the 5-position of the dibenzo-cycloheptadiene by 3 carbon atoms along the shortest route, namely, 5-hydroxy-5-{[1'-methyl-pyrrolidinyl-(3')]-methyl}-and 5-hydroxy-5-{2'-[1" - methyl - pyrrolidinyl - (2")]-ethyl}-dibenzo[a,d]cyclohepta[1,4]diene can be prepared as follows: Dibenzo [a,d]cyclohepta[1,4]diene-5-one is added to a solution of a compound of the formula,

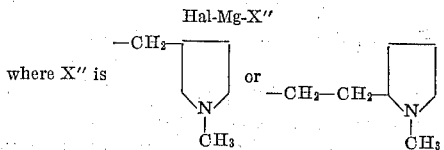

The mixture is then heated until the reaction is complete. The reaction mixture is then hydrolyzed in the cold with an aqueous ammonium chloride solution and extracted with a water-immiscible organic solvent, preferably chloroform. The resulting compound of the formula,

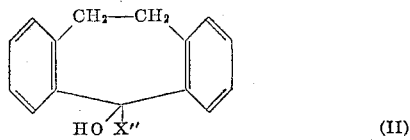

in which X″ has the above significance, may, if desired, be purified by crystallization.

At room temperature, the acid addition salts of the compounds I are generally stable and crystalline.

The compounds of Formula I are useful as intermediates for the production of pharmaceuticals and their physiologically acceptable acid addition salts and themselves are characterized by possessing pharmaceutical properties in that they have anti-depressant action with a minimum of undesirable side effects. Surprisingly these compounds of Formula I have been found to display a stronger anti-depressant action than the corresponding cycloheptene derivatives unsaturated at the 10–11 position.

A suitable daily dosage has been found to be from 20–500 mgs.

In the following non-limitative examples all temperatures are stated in degrees centigrade. The melting points are uncorrected.

*Example 1.—5-{[1′-methyl-pyrrolidinyl-(3′)]-methyl}-dibenzo[a,d]cyclohepta-[1,4]diene*

The desired compound is obtained as follows:

10 g. of 5-hydroxy-5-{[1″-methyl-pyrrolidinyl-(3′)]-methyl}-dibenzo[a,d]-cyclohepta[1,4]diene, melting point 134–135° are heated at reflux for 6 hours with 100 cc. of hydriodic acid (d.=1.7), which has been decolourized with some hypophosphorous acid, and 10 g. of red phosphorus whilst stirring well. 200 cc. of water are then added to the cooled mixture and the precipitate is decanted. This is stirred up with a sodium hydroxide solution and methylene chloride. After filtration of the undissolved phosphorus the methylene chloride layer is separated and the aqueous phase extracted a further three times with methylene chloride. After drying of the combined extracts over potassium carbonate and evaporation of the solvent, the residue is dissolved in ether. Undissolved flakes are filtered off and the solution is again evaporated. The remaining oily base is dissolved in isopropanol, 1.5 g. of fumaric acid added to the solution and the mixture heated. The resulting neutral fumarate is recrystallized from ethanol. Upon heating it slowly turns brown from 175° onwards and melts at 185–188° (decomposition). The free base is obtained in the form of an oil.

The starting material is produced by adding a solution of 13.5 g. of dibenzo[a,d]cyclohepta[1,4]diene-5-one in 15 cc. of terahydrofuran at 40° to a Grignard solution of 1.7 g. of magnesium shavings activated with iodine and 10.7 g. of 1-methyl-pyrrolidinyl-(3)-methyl chloride in 20 cc. of tetrahydrofuran. The mixture is subsequently again heated to the boil for 2 hours. The cooled reaction mixture is then poured into 150 cc. of a 10% ammonium chloride solution. The mixture is shaken a number of times with ether, the combined ethereal extracts dried over sodium sulphate and the solution evaporated. The residue is recrystallized from acetone, 5-hydroxy-5-{[1′-methyl - pyrrolidinyl - (3′)] - methyl}-dibenzo[a,d]cyclohepta[1,4]diene, having a melting point of 134–135° resulting.

*Example 2.—5-[1′-methyl-pyrrolidinyl-(3′)]-dibenzo-[a,d]cyclohepta[1,4]diene*

5 g. of hydroxy-5-[1′-methyl-pyrrolidinyl-(3′)]-dibenzo[a,d]cyclohepta[1,4]-diene, melting point 148–149°, are heated at reflux with 10 cc. of hydriodic acid and 9 g. of red phosphorus for 40 hours in a manner analogous to that described in Example 1. The process is then further effected as described in Example 1 and the base is directly converted to the hydrochloride. After recrystallization from ethanol, the salt melts at 260–263° (decomposition). The free base is obtained in the form of an oil.

The 5-hydroxy-5-[1′-methyl-pyrrolidinyl-(3′)]-dibenzo-[a,d]cyclohepta[1,4]-diene used as a starting material is produced as follows: A solution of 10.4 g. of debenzo-[a,d]cyclohepta[1,4]diene-5-one in 10 cc. of tetrahydrofuran is added dropwise to a suspension of 4 g. of pulverized sodium amide in 20 cc. of N-methyl-pyrrolidone-(2) at 5°. The solution is stirred for 20 minutes at 10° and the reaction mixture then poured into 200 cc. of water. The compound crystallizing after stirring for some time is filtered off and recrystallized from ethanol and ethyl acetate. A molecular compound consisting of 2 mol of 5-hydroxy - 5 - [1′-methyl-2′-oxo-pyrrolidinyl-(3′)]-dibenzo [a,d]cyclohepta[1,4]diene and 1 mol of dibenzo[a,d]cyclohepta[1,4]diene-5-one results and melts at 113–114°.

6.3 g. of this compound are added to a suspension of 1.2 g. of lithium aluminium hydride in 50 cc. of tetrahydrofuran at 5°. The mixture is then stirred for 1 hour at room temperature, then heated at reflux for 1 hour, cooled and a saturated sodium sulphate solution slowly added dropwise until a precipitate which may easily be filtered, forms. This is filtered off and boiled 3 times with tetrahydrofuran. The combined filtrates are evaporated and the residue recrystallized from acetone. Melting point 148–149°.

*Example 3.—5-{2′-[1″-methyl-pyrrolidinyl-(2″)]-ethyl}-dibenzo[a,d]cyclohepta[1,4]diene*

10 g. of 5-hydroxy-5-{2′-[1″-methyl-pyrrolidinyl-(2″)]-ethyl}-dibenzo[a,d]cyclohepta[1,4]diene, melting point 115–117° are heated at reflux for 6 hours with 100 cc. of hydriodic acid and 10 g. of red phosphorus in a manner analogous to that described in Example 1 and the required base is obtained as described in that example. The resulting base, which is oily, is dissolved in isopropanol, 1.5 g. of fumaric acid added to the solution and the mixture heated. The resulting neutral fumarate crystallizing upon cooling is recrystallized twice from ethanol. It melts at 166–167° (decomposition).

The starting material is produced by adding a solution of 10.4 g. of dibenzo[a,d]cyclohepta[1,4]-diene-5-one in 10 cc. of tetrahydrofuran at 50–60° to a Grignard solution of 1.3 g. of magnesium shavings activated with iodine and 8.9 g. of 1-methyl-pyrrolidinyl-(2)-ethyl chloride in 15 cc. of tetrahydrofuran. To complete the reaction the mixture is heated at reflux for a further 1½ hours. The cooled solution is then poured into 150 cc. of a 10% ammonium chloride solution and shaken with chloroform. After drying of the chloroform extract over magnesium sulphate and evaporation of the solvent, the residue is recrystallized from acetone, the 5-hydroxy-5-{2′ - [1″-methyl-pyrrolidinyl-(2″)]-ethyl}-dibenzo[a,d]cyclohepta[1,4]diene being obtained in the shape of fine needles having a melting point of 115–117°.

What is claimed is:

1. 5 - {[1′ - methyl-pyrrolidinyl-(3′)-methyl}-dibenzo[a,d]-cyclohepta[1,4]diene or its physiologically acceptable acid addition salts.

2. 5 - [1′-methyl-pyrrolidinyl-(3′)]-dibenzo[a,d]cyclohepta[1,4]diene or its physiologically acceptable acid addition salts.

3. 5 - {2′ - [1″ - methyl-pyrrolidinyl-(2″)]-ethyl}-dibenzo[a,d]cyclohepta[1,4]diene or its physiologically acceptable acid addition salts.

No references cited.

ALEX MAZEL, *Primary Examiner.*

JOSE TOVAR, *Assistant Examiner.*